United States Patent Office 2,744,889
Patented May 8, 1956

2,744,889

ESTER-ACIDS FROM HIGHER FATTY ACIDS AND RESIN ACIDS

Frederick H. Gayer, Chicago, Ill.

No Drawing. Application December 29, 1952,
Serial No. 328,525

15 Claims. (Cl. 260—97.5)

This invention relates to new compositions of matter and methods of making the same, and more particularly to compounds produced by chemically combining higher fatty acids with resin acids through the medium of methylolation.

It is well known that rosin can be made to react with formaldehyde. The reaction involved is generally considered a simple addition of the elements of formaldehyde either to a double bond (Prins Reaction, Chemical Abstracts 1919, 3155; 1920, 1662) or to a saturated carbon atom possessing a reactive hydrogen. In either case the resulting compound has the properties of an alcohol and could be conceived as having attached a methylol group, —CH₂OH, which branches off the carbon atom with which the formaldehyde reacted. Thus, the reaction of abietic acid, $C_{19}H_{29}COOH$, with HCHO would result in a methylolated abietic acid, $$HOCH_2C_{19}H_{28}COOH$$

The prior art has, in one form or another, used the reaction between formaldehyde and rosin to obtain resinous products of a higher melting point than rosin. An example of the prior art is Patent No. 2,374,657 to Bain who proposed heating a mixture of rosin, formaldehyde and a large excess of a volatile fatty acid. In the course of the reaction the rosin was methylolated and the fatty acid became esterified with the methylol hydroxyl:

$$CH_3COOH + HCHO + C_{19}H_{29}COOH = \\ CH_3COOCH_2C_{19}H_{28}COOH + H_2O$$

After distilling the unreacted excess acetic acid in vacuo the distillation residue consisted of the acetic acid ester of methylolated rosin which was termed "primary resin condensate." On further heating in vacuo this product was decomposed into acetic acid which volatilized and a nonvolatile residue of a high melting point and assumed to consist of chain-like molecules which were visualized as resulting from the esterification of the methylol group of one resin acid molecule with the carboxyl group of another resin acid molecule. This was the product claimed.

It is apparent that the role played by Bain's primary resin condensate was that of an intermediate product which had to be decomposed in order to obtain the product desired. Bain did not observe any advantageous properties in his primary resin condensate which would have favorably distinguished it from rosin. The constants recorded for the primary resin condensates show them to be of a somewhat higher melting point than rosin and of a lower acid number than that calculated for the postulated ester compounds. Even if these constants would have appeared attractive, their conspicuous lack of stability on heating eliminates the primary resin condensates as commercially useful products.

I have now found that if a mixture of higher fatty acids, resin acids and formaldehyde is allowed to react, new and valuable products result. I consider as higher fatty acids the commercially produced fatty acids derived from vegetable, animal and marine oils and fats, from tall oil and from synthetic sources, the emphasis being on the $C_{18}$ fatty acids as the most widely distributed in nature and commercially the most important. If FCOOH stands for a higher fatty acid, the formation of the new products is expressed by Equation E:

$$FCOOH + HCHO + C_{19}H_{29}COOH = \\ FCOOCH_2C_{19}H_{28}COOH + H_2O \quad (E)$$

The resulting compounds are new compositions of matter, altogether different from the homologous compounds obtained from volatile fatty acids by the prior art. Since their molecule contains both an ester-linkage and a carboxyl group, they will be designated as ester-acids.

The most striking property of the new ester-acids is their stability at higher temperatures, stability being defined as constancy of the acid number. The acid numbers of ester-acids made with higher fatty acids do not change on heating at 250° C. at atmospheric or reduced pressures. They are non-volatile at 250° C. and reduced pressures at which both fatty and resin acids would freely distill. Since their potential applications and the making of derivatives involve processing at higher temperatures, the thermal stability of the ester-acids is of great practical importance. I have found that in order to achieve this stability the fatty acid component of the ester-acids has to have a chain length of ten to twelve carbon atoms. If the chain of the fatty acid is less than ten carbon atoms as in the primary resin condensate of the prior art or in ester-acids made with lower fatty acids such as caproic ($C_6$) and caprylic ($C_8$) acids, a breakdown occurs at 175–200° C. and atmospheric pressure with loss of volatile fatty acid, lowering of the acid number and attendant obscure side reactions.

This result is entirely unexpected since, as is well known, the low molecular weight fatty acids are incomparably stronger acids than the higher fatty acids. For example, I have found that in preparing ester-acids with lower and higher fatty acids respectively, the rate of the reaction is considerably higher with butyric, caproic and caprylic acids than with the $C_{18}$ acids, as shown by the rapid decrease of the acid number of the reaction mixture. And yet, unless the product is allowed to cool when it has reached the acid number calculated for the respective ester-acid, the acid number keeps right on decreasing, indicating decomposition. In contrast, the higher fatty acids react much more slowly, especially toward the end of the reaction. But once they arrive at an acid number reasonably close to the calculated value, the acid number becomes stabilized and even heating to 250° C. will not further lower it. This thermal stability, of critical importance for the usefulness of the new ester-acids, could not have been predicted from the behaviour of the ester-acids of the prior art, just as the colloidal properties of the alkali metal salts of the higher fatty acids could not have been, a priori, predicted from the behaviour of a sodium acetate solution in water.

The new ester-acids are non-crystallizing, odorless substances ranging in consistency from soft solids to viscous liquids. The softening point of ester-acids is always lower than that of the resin acid source material and their density, viscosity, refractive index and optical rotation are invariably higher than the corresponding constants of the fatty and resin mixture from which they were made. Due to the large size of their molecule, the acid number of the ester-acids is considerably lower than that of fatty or resin acids. Indeed, the progress of the reaction according to (E) can be easily followed by determining the acid number of the reaction mixture. In a product resulting from the quantitative reaction of molecular weight proportions of higher fatty acids, resin acids and formaldehyde the acidity is entirely due to the carboxyl group of the resin acid portion of the molecule. Thus the acid number of an ester-acid made with stearic acid and crystalline abietic acid was found to be 96 as compared with the calculated value of 93. The product resulting from a tall oil of a fatty acid content somewhat in excess of equivalency with respect to the resin acids had an acid number of 87, calculated value 95. Considering the complexity of the reaction mechanism involved the agreement between calculated and found acid numbers is excellent and indicates a definiteness of composition surprising in reactions of this kind. This close agreement also shows that whatever, as yet unknown, side reactions may occur, do so only on a negligible scale.

The carboxyl group of the ester-acids is capable of entering into the usual reactions of carboxylic acids such as esterification and salt formation. Indeed, the novel character of the ester-acids becomes even more apparent in their derivatives. These can be prepared from the ester-acids but some of them can be directly synthesized by replacing in Reaction E the free resin acids with resin acid derivatives such as, for example esters and metallic resinates. Other modifications, not effecting the carboxyl group, can be made by reacting the ester-acids with unsaturated dicarboxylic acids such as maleic or fumaric acids, or with reactive unsaturated compounds of the vinyl or diolefin type such as styrene or cyclopentadiene. Like the ester-acids, their derivatives are new compositions of matter and are claimed as such herein.

The esters deriving from the ester-acids can be esters of monohydric alcohols, glycols, polyglycols, higher polyhydric alcohols or suitably substituted alcohols. Of the polyhydric alcohol esters those made from ester-acids derived from tall oil, or from drying oil fatty acids and resin acids, are of especial interest. They represent synthetic drying oils with a drying rate far superior to that of the esters made from tall oil or from a mixture of drying oil fatty acids and resin acids, indicating an inherently higher functionality of the ester-acids than that of the fatty and resin acid mixture from which they were made. This upgrading or beneficiation of drying oil fatty acids through ester-acid formation is a most striking and unexpected result. The fatty acid component of these ester-acids, acting as an internal, built-in plasticizer for the resin acid component also contributes to the improved film qualities of their esters. As compared with mixed fatty and resin acid esters, the tendency toward brittleness is greatly reduced.

The salts of the ester-acids also possess unique properties. The alkali and alkaline earth metal salts, in the anhydrous state, are hard, transparent, resinous solids, whereas mixtures of the corresponding salts of fatty and resin acids are opaque and heterogeneous. Furthermore, not only the alkaline earth metal salts but also the alkali metal, ammonium and amine salts of the ester-acids are soluble in hydrocarbon solvents in which the same salts of fatty and resin acids are altogether insoluble.

By effecting a chemical union between higher fatty acids and resin acids not only a greatly enlarged molecule results but also one with a unique structure which can best be visualized as a resin acid molecule with a long side chain attached through the ester linkage. The length of this side chain is of critical importance as far as the properties of the ester-acids are concerned. If the side chain contains less than ten carbon atoms the resulting combination is loose, thermally unstable and retaining, to a considerable extent, the properties of the resin acids. In contrast, the influence of a side chain of ten or more carbon atoms is such that the ester-acid molecule assumes unexpected properties, possessed neither by fatty acids nor resin acids nor by mixtures of the two.

Not only do my new ester-acids possess new and advantageous properties. Their use also involves economies which far outweigh the cost of methylolation and esterification. Because of the low acidity of the ester-acids only about half the quantity of polyhydric alcohol is required for preparing esters as would be needed for esterifying, separately or in a mixture, the fatty acids and resin acids from which the ester-acids have been prepared. Furthermore, in using ester-acids for modifying alkyd resins less dicarboxylic acid is required to obtain the effect of the same oil length as when fatty and resin acids as such are used which again represents an economy in dicarboxylic acid and polyhydric alcohol.

The unique properties enumerated such as thermal stability, large molecular size accompanied by a reactive carboxyl group, up-grading of unsaturated fatty acids, solubility in hydrocarbons of the salts of the alkali metals and nitrogen bases, make the ester-acids appear as potential starting materials for synthetic resins, surface coatings, plasticizers, waxes, adhesives, surface active agents, etc.

While ester-acids in their concentrated form and resulting from the quantitative reaction of molecular proportions of fatty acids, resin acids and formaldehyde according to (E) have new and superior properties when compared with the fatty and resin acid mixtures from which they were prepared, I have also found, as another aspect of my invention, that fatty acids, resin acids or mixtures of both which contain ester-acids in only minor proportions possess new and valuable properties and therefore come within the scope of the present invention. Thus, ester-acid concentrations as low as 10% in tall oils or tall oil fractions exert a highly beneficial effect on the mixtures and derivatives made from them such as lower acid number, higher drying rate, favorable viscosity relationships, elimination of tall oil odor and preventing crystallization of resin acids. Such mixtures can be made synthetically by adding pure ester-acids to fatty and resin acid combinations or tall oils but preferably the ester-acids are formed in situ within starting materials of a wide range of compositions. Thus, (1) in tall oils or tall oil fractions containing a molecular excess of fatty acids over resin acids, all of the resin acids and their equivalent of fatty acids may be transformed into ester-acids, the excess of fatty acids remaining unreacted; (2) in a tall oil fraction containing a molecular excess of resin acids over fatty acids, all of the fatty acids and their equivalent of resin acids may be made to form ester-acids, the excess of resin acids remaining as a diluent; and (3) in a tall oil or a fatty-resin acid mixture of any suitable composition both fatty and resin acids may be allowed to react only partially by suitably reducing the proportion of formaldehyde taking part in the ester-acid reaction. Obviously, the products resulting from (1) are mixtures of fatty acids and ester-acids, those from (2) mixtures of resin acids with ester-acids, and the products from (3) mixtures of fatty acids, resin acids and ester-acids. The principle of modification by partial ester-acid content is applicable to all commercially available sources of higher fatty acids and resin acids but is of especial importance when applied to tall oils and tall oil fractions as used in the field of drying oils.

The sources of resin acids used for the preparation of the ester-acids are resin acid mixtures originating from various species of coniferous trees such as gum rosin, wood rosin and tall oil resin acids. Crystalline resin acids, obtained either from rosin or from tall oil, being free of neutral matter and composed largely of abietic type acids, are especially desirable starting materials. The commercially available hydrogenated, polymerized and disproportionated rosins react much slower than rosin. My preferred starting materials are rosin, tall oil resin acids and crystalline resin acids, all to be identified in the claims as "resin acids."

The higher fatty acids used according to the present invention are the commercially produced fatty acids of the origin stated before. The higher fatty acids are sharply distinguished from the lower fatty acids by their lack of volatility at atmospheric pressure, their insolubility in water and the properties of their alkali and alkaline earth metal salts. Ascending from the lower to the higher fatty acid series, a reversal of these properties takes place when the length of the carbon chain reaches 10–12 carbon atoms. An analogous behaviour is shown as to thermal stability of ester-acids made with fatty acids of less than ten and ten or more carbon atoms respectively. I therefore define the term "higher fatty acids" as denoting fatty acids having at least ten carbon atoms in the molecule. These fatty acids can be saturated or unsaturated, straight chain or branched chain, hydroxylated, halogenated or otherwise suitably substituted aliphatic, monocarboxylic acids or mixtures of these types. In the following parts of this disclosure the term "fatty acids" denotes higher fatty acids as defined.

A most convenient starting material for the preparation of the new ester-acids is tall oil or tall oil fractions, refined by distillation or chemical methods and available in a wide range of composition as to fatty acid and resin acid ratio. Crude tall oil is equally suitable as a starting material and the crude product may be either used as such or it may be refined by chemical and/or adsorption methods.

As a source of formaldehyde I use either an aqueous solution of formaldehyde or one of the solid polymers of formaldehyde or gaseous formaldehyde. A strong aqueous solution of formaldehyde is highly effective in methylolating resin acids but it has the disadvantage that after the methylolation is completed the water has to be removed before the esterification reaction can proceed on an important scale. Polymeric formaldehyde such as commercial paraformaldehyde, the lower polyoxymethylene glycols or the higher polyoxymethylenes contain, at most, only a few per cent of water which under the conditions of the reaction is rapidly lost by evaporation. These polymers depolymerize on heating and yield substantially anhydrous, gaseous monomeric formaldehyde which is the actual reactant. Obviously, gaseous formaldehyde generated outside and conducted into the reaction mixture is equally suitable.

Reaction E which underlies the preparation of the ester-acids proceeds in two stages. In the first the resin acids are methylolated, in the second the fatty acids undergo esterification with the methylol hydroxyl. In the course of the reaction the acid number of the reaction mixture steadily decreases until the reaction is complete. To define, I consider the reaction complete when it results in a product the acid number of which is reasonably close to the calculated or expected value and remains constant on heating the product for one hour at 225° C.

The proportions of the reactants are determined by the end product desired. If the object is the preparation of pure ester-acids according to Reaction E, the weights of the reacting fatty acids and resin acids have to be in proportion with their average molecular weights. Since fatty acids and resin acids are monobasic acids their average molecular weight is the same as their combining or equivalent weight which can be calculated from the acid number. Molecular weight proportions are 48 parts fatty acids and 52 parts resin acids, expressed as $C_{18}$ fatty acids and abietic acid respectively. If the composition of a given starting material, like a tall oil or a tall oil fraction, does not conform to this ratio the proportion can be established by either adding the calculated amounts of fatty acids or resin acids or tall fractions sufficiently richer in fatty acids or in resin acids. If the composition of a tall oil differs only slightly from the molecular weight proportions of fatty and resin acids it can be processed as it is since the resulting product will be substantially equivalent to pure ester-acids. I also may start the reaction with less than a molecular weight proportion of either acid and add the balance after the reaction got under way.

Products with only a partial ester-acid content can be made from starting materials ranging from extreme fatty acid to extreme resin acid proportions.

The proportions of formaldehyde, whether used as gas, as a polymer or an aqueous solution, is always in excess of that which enters into reaction since some of it is lost before it had a chance to react. In preparing pure ester-acids according to E I prefer to use about two moles of formaldehyde to one mole of either of the acids or approximately 10% calculated on the weight of the mixture of fatty and resin acids. Any further increase of the proportion of formaldehyde has no effect on the final product the excess being simply lost by vaporization. The excess used assures a steady supply of formaldehyde until the esterification reaction is finished. The formaldehyde may be added all at once in the beginning or in portions during the reaction. In making products with a partial ester-acid content the proportion of formaldehyde is related to the extent of the reaction desired and is determined by experiment. For example, using 1, 2 and 3 per cent paraformaldehyde on the weight of the starting material will result in products containing an increasing proportion of ester-acids as can be calculated from the decreasing acid numbers. By intrapolation the paraformaldehyde requirements for any desired degree of ester-acid formation can be calculated. A prediction of the acid number of partially reacted products is largely based on experience and depends not only on the proportion of paraformaldehyde added to the reaction mixture but also on the processing technique, primarily the temperature-time schedule used in effecting the ester-acid reaction. However, the definition of a complete reaction, as presented hereinbefore, holds also for partially reacted products, the reaction being considered complete to the extent expected and the acid number remaining constant on heating the product for one hour at 225° C.

My preferred method for preparing the ester-acids consists of allowing a mixture of fatty acids, resin acids and paraformaldehyde to react under substantially anhydrous conditions. On heating such a mixture the paraformaldehyde depolymerizes to monomeric formaldehyde which dissolves in the reaction mixture and proceeds to methylolate the resin acids. As soon as methylolated resin acids are available esterification starts, even at surprisingly low temperatures. From thereon methylolation and esterification proceed simultaneously until the methylolation reaction is finished and further heating serves to complete the esterification reaction.

The temperatures used for preparing the ester-acids in their pure form according to Reaction E range approximately between 100 and 225° C. This does not mean that ester-acids can be efficiently prepared at any temperature between 100 and 225° C. I have recognized that within this wider range there is a narrower range from about 100 to 150° C. which during the early stages of the reaction is of critical importance for the final outcome of the reaction. This temperature range is critical because below 100° C. the rate of Reaction E is negligible, both depolymerization of paraformaldehyde and esterification being too slow, whereas above 150° C. the paraformaldehyde decomposes too rapidly for efficient utilization of the gaseous formaldehyde so that much of it is lost unreacted. In the critical range of temperature, beginning at or somewhat above 100° C. the rate of depolymerization is sufficiently high and commensurate with the rate at which the monomeric formaldehyde is taken up by the resin acids. Furthermore, the rate of the esterification reaction which is the dominant and concluding step in Reaction E increases rapidly as the temperature is raised above 100° C. Since esterification causes a decrease in the concentration of the methylol compounds it stimulates further methylolation which again makes for efficient utilization of the formaldehyde. Because of this balanced relationship between methylolation and esterification in the critical range of temperature the reaction is started at about 100° C. and allowed to run at least the greater part of its course by slowly raising the temperature to 150° C. I prefer to initiate the reaction at a temperature of 110-120° C. and remain at that temperature level until the reaction shows a tendency to slow down. Then the temperature is raised either slowly and continuously or at intervals from one temperature platform to a higher one, the rate of temperature increase being such as to assure a high reaction rate and at the same time preserving the balance between methylolation and esterification. Given sufficient time the reaction can be brought to completion at temperatures up to 150° C. However, since esterification of the last 10-20% of the reaction mixture proceeds so slowly at 150° C. that it would require an excessive proportion of the total time involved, I accelerate completion of the esterification reaction by raising the temperature at a rapid rate up to 225° C. and keeping it there until the acid number is stabilized. Even if the final acid number has been reached at a lower temperature, heating the reaction product to 225° C. is necessary in order to purge the product of tenaciously held traces of excess formaldehyde. For heat bleaching the temperature may be still further raised and kept for a short time between 225 and 250° C. Alternative means for completing the reaction and obtaining a product of constant acid number are: applying a partial vacuum or using a solvent reflux system at suitably high temperatures to accelerate removal of the water formed in the last stages of the esterification reaction.

As can be seen from the foregoing, an important feature of the present process is the gradual raising of the temperature from about 100 to 225° C. In the critical range of 100–150° C. the rate of temperature increase is slow and may extend over a period of from 20 to 100 hours or more, whereas the range from 150 to 225° C. may be covered in from one to several hours. Heating in the critical range of temperature should be conducted in such a way that the reaction proceeds at least 80–90% to completion. If the time spent in the critical range was too short or the temperature raised too rapidly, no amount of heating above 150° C. will lead to a product of the expected acid number. Therefore the rate at which the temperature is raised is of great importance from the standpoint of completeness of the reaction and efficiency of operation. The optimum rate of temperature increase is one which leads to a complete reaction in the shortest time. It varies with the reactivity of the starting materials and should be determined by experiment.

While in the method just described the reaction is contemplated to take place at atmospheric pressure, the reaction may be carried out, right from the start, at a pressure higher than atmospheric. Also, processing may be batchwise or continuous, in which latter case the reaction mixture is subjected to a flow in a system having a suitable temperature gradient. In such a system the formaldehyde as paraformaldehyde may be added at the starting point of the flow or gaseous formaldehyde may be introduced in countercurrent to the flow of the mixture of acids.

The use of solvents for effecting Reaction E from the very start has no advantage and is unnecessary since at the specified reaction temperatures the reaction mixture is invariably in the liquid state, the fatty acids serving as solvents for the resin acids. If volatile solvents are used in a reflux system their boiling points and proportions to the reaction mixture should be such that the same temperatures and temperature changes can be produced as in the absence of solvents. There is, for example, no point in reacting with formaldehyde a 50% solution of a fatty acid-resin acid mixture in a solvent boiling below 100° C., like benzol, because the refluxing temperature will be much too low to effect esterification.

For the preparation of products with a partial ester-acid content the same considerations as to temperature range and rate of temperature increase hold as for that of the ester-acids in their pure form. However, a shorter time is required to effect such reactions where lower final ester-acid concentrations are desired. A final heating to 225° C. to stabilize the acid number and strict standardization of the operating procedure as to proportion of formaldehyde added and the temperature-time relationship is necessary to obtain uniform products from the same starting material.

In the preferred method just described a mixture of all three reactants is allowed to react and to a great extent the esterification reaction runs concurrently with the methylolation reaction. In an alternative method, I separate the two stages of Reaction E and effect the methylolation first, before any or any substantial esterification can take place. For example, if the resin acids are available as a separate starting material, such as rosin, they first may be made to react with formaldehyde under conditions as given by the prior art, and then the fatty acids are added to effect esterification. Even when processing a mixture of fatty and resin acids, such as tall oil, it is possible to separate the methylolation step from the esterification step by refluxing with strong aqueous formaldehyde. This will result in methylolation of the resin acids. Only negligible esterification of the methylol compounds will take place because of the presence of water and the prevailing low temperatures. When, after methylolation, the aqueous phase of unreacted formaldehyde is removed, esterification is effected by raising the temperature. To avoid possible decomposition of the highly concentrated methylol compounds by too rapid heating, the same temperature schedule is followed as in the preferred method, namely, heating within the critical range of 100–150° C. and, if necessary, completing the esterification at temperatures ranging from 150 to 225° C.

It is apparent that of the two methods proposed the preferred method has definite advantages over the alternative method. In the latter it is difficult to achieve complete methylolation because, when present in high concentration, methylolated resin acids decompose at about 140–150° C. Methylol groups lost during heating in the esterification phase cannot be replaced and therefore the reaction cannot go to completion in the sense of Reaction E. In contrast, in the preferred method esterification begins long before methylolation is complete and thereby prevents the building up of high concentrations of methylol compounds. The sustained supply of formaldehyde assures regeneration of any methylol compounds which may have suffered chance decomposition before they became esterified. Therefore, the preferred method is recommended whenever the reaction is to be complete with respect to the resin acids. For preparing compositions of a partial ester-acid content, with only a portion of methylolated resin acids entering into the esterification reaction, the preferred alternative methods are equally suitable.

Both the methylolation and esterification reactions can be accelerated by catalysts such as mineral acids, sulphonic acids, the stronger mono- and dicarboxylic acids, inorganic salts, di- and trivalent metal salts of organic acids, finely divided metals, etc. In order to avoid side reactions and consequent contamination of the reaction product the proportion of these catalytic substances should be kept to traces or a maximum of the order of one per cent or less calculated on the weight of the reaction mixture. Dilute mineral acids may be present in larger proportions when used to promote methylolation with aqueous formaldehyde at or slightly above room temperature.

A number of specific examples illustrating the invention follow:

*Example 1*

A mixture of 1 kg. refined tall oil (acid #160, resin acids

46%, unsap. 7%, fatty acids 47%) and 100 gr. paraformaldehyde was heated according to the temperature schedule recorded in the table below which also indicates the acid numbers of the reaction mixture after each heating period.

| Hours | Temperature, °C. | Acid Number | Saponification Value |
|---|---|---|---|
| 0 | | 160 | 167 |
| 25 | 112 | 128 | |
| 50 | 112–120 | 109 | |
| 24 | 120–140 | 99 | |
| 26 | 140–154 | 95 | |
| 5 | 154–205 | | |
| 8 | 205 | 83 | |
| 4 | 225 | 83 | |
| 2 | 250 | 83 | 163 |

The following comparisons were made between the original, unreacted tall oil and the ester-acid reaction product:

| | Tall Oil | Reaction Product |
|---|---|---|
| Specific gravity | 0.99 | 1.01. |
| Viscosity, Gardner | $Z_2$ | Higher than $Z_6$. |
| Viscosity, at 100° C., c. p. s. | 146 | 228. |
| Refractive index, $n_D^{45}$ | 1.501 | 1.511. |
| Specific rotation, degrees | −16 | −64. |
| Resin acid content by esterification method, percent. | 46 | 45. |

*Example 2*

One mole of each of the saturated fatty acids ranging from caproic acid ($C_6$) to stearic acid ($C_{18}$) were heated with one mole abietic acid and two moles formaldehyde as paraformaldehyde according to the temperature schedule shown in the following table which also indicates (1) the initial acid numbers of the fatty and resin acid mixtures; (2) the calculated acid numbers of the theoretical ester-acids expected and (3) the actual acid numbers found during and at the end of the reaction.

| | $C_6$ | $C_8$ | $C_{10}$ | $C_{12}$ | $C_{14}$ | $C_{18}$ |
|---|---|---|---|---|---|---|
| (1) Acid # of fatty and resin acid mixture | 264 | 248 | 233 | 220 | 210 | 189 |
| (2) Calc. acid # of ester-acids | 128 | 120 | 113 | 107 | 102 | 93 |
| (3) Acid numbers during reaction: | | | | | | |
| 23 hours at 109° C | 175 | 188 | 184 | 172 | 173 | 160 |
| 21 hours at 119° C | 173 | 146 | 147 | 143 | 140 | 131 |
| 20 hours at 135° C | 137 | 123 | 117 | 114 | 113 | 105 |
| 6 hours at 135–225° C | 115 | 110 | 115 | 109 | 107 | 101 |
| 1 hour at 225° C | 111 | 105 | 114 | 108 | 105 | 99 |
| 1 hour at 225° C | 108 | 101 | 114 | 108 | 104 | 99 |

It will be noted that at 225° C. the acid numbers of the products from the $C_6$ and $C_8$ fatty acids decrease below the calculated acid number of the expected ester-acids whereas those of the products from the higher fatty acids remain substantially constant.

As used herein, "higher fatty acids" means those fatty acids having at least ten carbon atoms in the molecule.

*Example 3*

A mixture of 140 grams Neofat 3R (composed of saturated and unsaturated, largely $C_{18}$ fatty acids), acid No. 200, 168 grams WG wood rosin and 20 grams paraformaldehyde was heated at 107° C. until the acid number decreased to 110. Ten grams more paraformaldehyde were added and the temperature slowly raised to 158° C. when the acid number was 90. Further heating in three hours up to 225° C. did not decrease the acid number.

Acid number 90 of the final product closely agrees with the calculated value of 88 which was calculated under the assumption that all of the resin acids contained in rosin will take part in the ester-acid reaction. Since rosin contains several non-abietic type acids, it appears that the ability to add formaldehyde is not necessarily restricted to resin acid structures containing conjugated double bonds although the presence of considerable proportions of abietic and abietic type acids may be necessary to induce non-abietic type acids to react.

*Example 4*

The same grade of tall oil as was used in Example 1 was fortified with abietic acid, acid No. 184, to create a molecular weight proportion of fatty and resin acids. Ten per cent paraformaldehyde, calculated on the weight of the acids, were added and the mixture heated from 123° C. to 150° C. for 59 hours. The acid number of the reaction mixture was now 95. On further heating from 150 to 225° C. in 6 hours the acid number decreased to 92 and remained unchanged on keeping the mixture at 225° C. for 2 hours. The calculated acid number of the expected ester-acid is 90.

*Example 5*

To 50 grams of tall oil, acid No. 169 and containing 42% resin acids, 5% unsaponifiable and 53% fatty acids, two grams of polyoxymethylene were added and the mixture heated 3 hours on the steambath which decreased the acid number to 159. The temperature of the mixture was now slowly raised to 140° C. and the acid number decreased to 154. Over a period of two hours the temperature was further raised to 230° C., the acid number decreasing to 141 and remaining constant on further heating at 230° C. Here the acid number decreased 28 points from which the ester-acid content of the mixture can be calculated approximately as between 35 and 40%.

*Example 6*

Three portions of a densely crystallizing tall oil fraction containing 65% resin acids and 30% fatty acids, were warmed to dissolve the crystals. Sample 1 served as bland with no formaldehyde added. To sample 2 and 3 there was added 1 and 2% paraformaldehyde, respectively. All three samples were now heated at 135° C. for 22 hours. At the end of that period crystallization was copious in sample 1, slight in second and negligible in sample 3. On heating all three samples rapidly from 135 to 225° C. the crystals dissolved in all three samples but reappeared after standing over night in blank. Sample 2 and 3 did not show any signs of crystallization after several months standing and remained fluid.

*Example 7*

One hundred grams of the same strongly crystallizing tall oil fraction which was used in Example 6, and 10 grams of paraformaldehyde were made to react at temperatures ranging from 110 to 200° C. The product was a non-crystallizing solid of acid number 120.

*Example 8*

Fourteen parts linseed oil fatty acids, 18 parts estergum (glycerine ester of rosin) and 3 parts of paraformaldehyde were heated at 120, 135 and 153° C. and then the acid number stabilized at 230° C. The product was a soft solid of acid number 17.

*Example 9*

A refined and hydrogenated tall oil was heated with 10% of its weight of paraformaldehyde at 130° C. until the acid number decreased to 118. The product was now heated for 7 hours at 170° C. The acid number of the final product was 116.

*Example 10*

A. A sample of ester-acids of acid number 88, made from refined tall oil of acid number 161 and a resin acid content of 45%, was heated in a distilling flask equipped with a condenser tube and receiver at 30 mm. pressure, the temperature of the liquid phase being gradually raised to 275° C. Less than 2% of distillate was obtained.

B. The same tall oil which was used to prepare the ester-acids under (A) was heated in the same apparatus and under the same conditions of pressure and temperature as in (A). Sixty-five per cent of distillate was obtained.

*Example 11*

A. Two kilograms of a refined tall oil, acid number 161, and 500 cc. 40% formaldehyde solution were refluxed 12 hours. Most of the aqueous phase settled out and was removed. For complete dehydration the oil was heated at 90–95° C. under a pressure of 330 mm. The product had an acid number of 142, indicating only slight esterification. The product was now heated in 1½ hours to 130° C. kept at that temperature 4 hours, the temperature raised in 1½ hours to 200° C. and kept at that temperature level for 4 hours. The acid number at this stage was 103 and did not change on heating the oil at 225° C. for two hours.

B. One hundred-fifty grams of the product from (A) acid number 103, and 11 grams pentaerythritol were heated to effect esterification at temperatures ranging from 230 to 290° C. The acid number of the ester was 18.

C. One hundred-fifty grams of the refined tall oil from which the product under (A) was made and 17.3 grams pentaerythritol were heated parallel with sample (B). The acid number of the esterified product was 12.

D. To samples of the esterified products (B) and (C) drier was added (0.06% Co, 0.6% Mn, 0.6% Pb) and films of 1 mil thickness drawn. The tack-free drying time of the film from (B) was 6 hours, that from (C) 11 hours. The film from product (B) failed on an ⅛" mandrel in 12 days, that from (C) in 4 days.

*Example 12*

Five hundred grams crude tall oil, acid number 166, and containing 44% resin acids were refluxed with 125 cc. 40% formaldehyde solution for 12 hours and the aqueous layer separated. The oil had an acid number of 149.

To effect esterification of the fatty acids with the methylolated resin acids a solution of the oil in nahptha was refluxed using a water trap attachment. By gradually distilling off solvent, the liquid temperature was raised up to over 200° C. On evaporating the residual naphtha the product was of light color and had an acid number of 99.

Another sample of the oil of acid number 149 was heated from 130 to 200° C. in 10 hours. The acid number was now 101 and the resin acid content by the esterification method was 43%.

*Example 13*

Fifty grams of crude tall oil and 6 cc. 40% formaldehyde solution were refluxed 3½ hours. After removing the aqueous layer the oil is clear and viscous and has an acid number of 159. On heating the oil 2 hours at 220° C. a product of acid number 128 was obtained which did not crystallize on prolonged standing and was devoid of the unpleasant odor of tall oil.

*Example 14*

A. One hundred grams of product having acid number 83, from Example 1, were exactly neutralized with 42 cc. 3.52 N sodium hydroxide, the water evaporated by heating from 100 to 150° C. until the liquid assumed a quiescent surface. The resulting anhydrous soap was a transparent resin of good color. It was completely soluble in petroleum naphtha and benzol, slightly soluble in methanol and formed a coarse dispersion in water.

B. Three separate samples of the same tall oil ester-acid as used in (A) were neutralized with (1) gaseous ammonia, (2) ethylene diamine and (3) pentaethylene tetramine. The resulting products were clear, highly viscous oils, completely soluble in petroleum naphtha and insoluble in methanol.

*Example 15*

One mole of ester-acids made from tall oil and having an acid number of 88, and one mole of triethylene glycol were heated at a temperature from 200 to 275° C. until the acid number of the mixture decreased to 10. The product showed surface active properties.

*Example 16*

One mole of Neofat 3R, one mole of Abalyn (methyl ester of rosin) and two moles of formaldehyde as paraformaldehyde were heated at temperatures ranging from 105 to 225° C. The product was a mobile oil of acid number 10.

I claim:

1. As a new composition of matter a substance from the group consisting of synthetic ester-acids of fatty acid having at least ten carbon atoms in the molecule and methylolated natural resin acid, the acid nature of the ester-acids being due to the free carboxyl group of the resin acid, the acid number of said composition remaining substantially unchanged when heated for one hour at 225° C. and being close to the theoretical acid number calculated for the expected product resulting from completion of the esterification reaction as to at least one of the reactants entering into the esterification reaction, esters of said ester-acids and salts of said ester acids.

2. A composition in accordance with claim 1 in which the acid number of the composition is substantially equal to that calculated for the ester-acids which result when quantities of said fatty acid and resin acid proportionate to their molecular weights and formaldehyde react until the acids are completely transformed into ester-acids.

3. A composition in accordance with claim 1 derived from tall oil.

4. A new composition of matter comprising a mixture of tall oil and ester-acids defined in claim 1 in which the ester-acid content is at least ten per cent by weight of the composition.

5. As a new composition of matter ester-acids of the general formula $FCOOCH_2RCOOH$ where FCOO is a fatty acid residue containing at least ten carbon atoms and RCOOH is a resin acid minus one hydrogen, the acid number of said composition remaining substantially unchanged when heated at 225° C. for one hour and being close to the theoretical acid number calculated for the expected product resulting from the esterification reaction in which said composition is produced.

6. A composition in accordance with claim 1 in which the fatty acids are derived from drying oils.

7. A composition in accordance with claim 1 in which the fatty acids are derived from non-drying oils.

8. A composition in accordance with claim 1 in which the fatty acids are saturated fatty acids.

9. A composition in accordance with claim 1 in which the substance is an amine salt of said ester-acids.

10. In the process of preparing thermally stable ester-acids from higher fatty acids and natural resin acids, the steps of heating a mixture of higher fatty acids and resin acids to a temperature of from about 100° C. to about 150° C. together with a formaldehyde-yielding substance for at least 20 hours until the major portion of the fatty acids and resin acids has reacted and continuing the reaction at temperatures between 150 and 225° C. for a period of time sufficient to produce a product having a substantially constant acid number when heated for one hour at 225° C.

11. The process of preparing thermally stable ester-acids in accordance with claim 10 in which the higher fatty and resin acids are derived from tall oil.

12. The process of preparing thermally stable ester-acids in accordance with claim 10 in which the higher fatty acids and resin acids are present in substantially molecular proportions.

13. In the preparation of thermally stable ester-acids from a mixture of higher fatty acids and natural resin acids, the steps of first methylolating the resin acids with aqueous formaldehyde, removing the aqueous phase, heating the anhydrous reaction mixture in the range from 100 to 150° C. to effect the major portion of the esterification reaction between the fatty acids and the methylolated resin acids, then reacting at a temperature from 150 to about 225° C. until the acid number of the reaction product is stable when heated for one hour at 225° C., the period of treating up to 150° C. being not less than 20 hours.

14. The process according to claim 10 in which fatty acids, resin acids and paraformaldehyde are mixed together and methylolation and esterification reactions are simultaneously promoted in the reaction mixture.

15. In the process according to claim 10, heating the higher fatty acids and resin acids with a quantity of formaldehyde-yielding substance insufficient to methylolate the entire resin acid content but sufficient to form a reaction product containing at least 10 per cent by weight of heat stable ester-acids.

References Cited in the file of this patent

UNITED STATES PATENTS

| | | |
|---|---|---|
| 2,374,657 | Bain | May 1, 1945 |
| 2,567,250 | St. Clair et al. | Sept. 11, 1951 |
| 2,572,071 | St. Clair et al. | Oct. 23, 1951 |